(12) United States Patent
Malrait et al.

(10) Patent No.: US 11,095,236 B2
(45) Date of Patent: Aug. 17, 2021

(54) DETECTION OF THE TYPE OF AN ELECTRIC MOTOR FOR THE CONFIGURATION OF A VARIABLE SPEED DRIVE

(71) Applicant: Schneider Toshiba Inverter Europe SAS, Pacy sur Eure (FR)

(72) Inventors: François Malrait, Jouy sur Eure (FR); Thomas Devos, Carrières sous Poissy (FR); Al Kassem Jebai, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 16/796,333

(22) Filed: Feb. 20, 2020

(65) Prior Publication Data

US 2020/0295679 A1 Sep. 17, 2020

(30) Foreign Application Priority Data

Mar. 14, 2019 (FR) ...................................... 1902610

(51) Int. Cl.
  *H02P 6/00* (2016.01)
  *H02P 6/08* (2016.01)
  *H02P 6/28* (2016.01)
  *H02P 23/14* (2006.01)
  *H02P 27/02* (2016.01)

(52) U.S. Cl.
  CPC ............... *H02P 6/085* (2013.01); *H02P 6/28* (2016.02); *H02P 23/14* (2013.01); *H02P 27/02* (2013.01)

(58) Field of Classification Search
  None
  See application file for complete search history.

(56) References Cited

U.S. PATENT DOCUMENTS

| 4,012,652 A * | 3/1977 | Gilbert ................ H02K 21/145 310/162 |
| 2008/0074070 A1 | 3/2008 | Kumar et al. |
| 2008/0278341 A1* | 11/2008 | Chiu .................... G01R 31/343 340/648 |
| 2014/0265990 A1 | 9/2014 | Chretien et al. |

FOREIGN PATENT DOCUMENTS

EP          1257049          11/2002

OTHER PUBLICATIONS

Search Report and Written Opinion for French Patent Application No. 1902610, dated Oct. 16, 2019, 8 pages.

* cited by examiner

*Primary Examiner* — Bentsu Ro
(74) *Attorney, Agent, or Firm* — Locke Lord LLP

(57) ABSTRACT

A method for configuring a variable speed drive in charge of power supply of an electric motor. The method comprises the application of a sequence of motor voltages to the electric motor by the variable speed drive and the obtaining, in parallel, of measurements of motor current. The method then determines a feature of the electric motor on the basis of the measurements of motor current and determines a type of electric motor at least as a function of the feature. The variable speed drive is then set up on the basis of the determined type of electric motor.

19 Claims, 4 Drawing Sheets

DETECTION OF THE TYPE OF AN ELECTRIC MOTOR FOR THE CONFIGURATION OF A VARIABLE SPEED DRIVE

TECHNICAL FIELD OF THE INVENTION

The invention relates to the configuration of a variable speed drive in charge of power supply of an electric motor, and in particular the configuration of the variable speed drive as a function of a type of the electric motor, notably for three-phase electric motors.

STATE OF THE ART

Electric motors can be divided into several categories. They comprise, on the one hand, direct current motors, and, on the other hand, alternating current motors.

In an industrial use, most of the alternating current motors are three-phase motors. These motors can be supplied directly connected to the electric grid, or by an active power converter, electronic starter or variable speed drive.

Since each type of three-phase alternating current motor operates differently, it is necessary to set up the variable speed drive using parameters specific to the type of motor to which it is linked.

Some variable speed drives require the manual selection of a motor type by a user. Such a selection activates functions dedicated to the motor type, such as functions of alignment, of fluxing, of identification or of compatibility with other functions.

The manual selection can comprise the selection of a parameter such as:
- a vector control law, for asynchronous motors, which is a control with speed loop;
- a control law for permanent magnet synchronous motors which can also be with speed loop on a vector control principle;
- a control law for variable reluctance synchronous motors which can also be with speed loop on a vector control principle;
- other control laws.

Such a manual selection is also likely to present errors, in which case a poor configuration can provoke a malfunction of the motor (inability to start, degraded performance, etc.) to the point of damaging the electric motor.

There is thus a need to simplify the configuration of a variable speed drive arranged to supply several types of electric motor, while preventing the errors associated with this configuration.

The present invention resolves the abovementioned drawbacks.

The documents US2014265990A1 and EP1257049A2 disclose a method for configuring and identifying a type of electric motor connected to a variable speed drive.

SUMMARY OF THE INVENTION

A first aspect of the invention relates to a method for configuring a variable speed drive in charge of power supply (three-phase for example) of an electric motor, the method comprising the following operations:
- applying a sequence S1 of motor voltages to the electric motor by the variable speed drive;
- obtaining measurements M1 of motor currents during the application of the sequence S1 of motor voltages;
- determining a feature C1 of the electric motor on the basis of the measurements M1 of motor currents;
- determining a type of electric motor at least as a function of the feature C1;
- configuring the variable speed drive as a function of the determined type of electric motor.

Thus, the invention makes it possible to set up, without intervention from a user, a variable speed drive as a function of the determined motor type.

According to one embodiment, the feature C1 can characterize the fact that the electric motor exhibits or does not exhibit an anisotropic property.

Thus, configurations differentiated according to whether the electric motor is anisotropic or not can be applied.

In addition, the sequence S1 of motor voltages can be applied successively twice, in at least two non-colinear voltage directions, according to the following operations:
- applying the sequence S1 of motor voltages to the electric motor in a direction D1;
- obtaining measurements M11 of motor currents during the application of the sequence of motor voltages in the direction D1;
- in case of determination that the measurements M11 exhibit oscillations, determining that the electric motor exhibits an anisotropic property;
- otherwise:
  - applying the sequence S1 of motor voltages to the electric motor a second time at least in a direction D2 non-colinear to the direction D1;
  - obtaining measurements M12 of motor currents during the application of the sequence S1 of motor voltages in the direction D2;
  - in case of detection that the measurements M12 exhibit oscillations, determining that the electric motor exhibits an anisotropic property;
  - otherwise, determining that the electric motor does not exhibit any anisotropic property.

Such an embodiment makes it possible to enhance the accuracy of the detection of the anisotropic property. Indeed, the injections in two different and non-colinear directions (preferably spaced apart by 60 degrees) make it possible to ensure that the anisotropy is detected or not for sure. It is also preferable for the two directions D1 and D2 not to be orthogonal, which makes it possible to avoid blocking the motor in an unstable equilibrium in the direction D2, notably when the electric motor is of variable reluctance synchronous type.

Preferentially, when the sequence S1 is applied a second time, the applications of the sequence S1 in different directions are spaced apart by a predefined delay, for example of between 1 and 30 seconds as a function of the power of the variable speed drive. In the case of an induction motor, such a delay makes it possible to allow the magnetic flux to revert to zero in the electric motor between the two injections, making it possible to avoid a poor detection of the motor type.

In addition or as a variant, if the motor does not exhibit any anisotropic property, the electric motor can be determined to be of induction type.

It is thus possible to detect an induction electric motor and to set up the variable speed drive which is linked accordingly.

According to one embodiment, if the motor exhibits an anisotropic property, the method can further comprise:
- detecting a main anisotropy axis of the electric motor following the application of the sequence S1 of motor voltages;

applying a sequence S2 of motor voltages to drive the motor in rotation as a function of the anisotropy axis;

obtaining measurements M2 resulting from the application of the sequence S2 of motor voltages;

determining a type of anisotropy of the electric motor as a function of the measurements M2. The type of electric motor is determined at least as a function of the feature C1 and of the feature C2.

In addition, the feature C2 can characterize the fact that the electric motor comprises a rotor having or not having a permanent magnetic flux.

Thus, the configurations that are differentiated according to whether the electric motor exhibits a permanent magnetic flux or not can be applied.

The measurements M2 can be:

measurements of motor currents acquired during the application of the sequence S2;

measurements of motor voltages acquired after the application of the sequence S2.

The measurements M2 of motor currents make it possible in fact to determine that the rotor comprises or does not comprise a permanent magnetic flux. To this end, the sequence S2 can consist in reducing the motor voltage from a given initial value, in observing the percentage reduction of the motor current and in comparing this percentage with a predetermined threshold, as detailed hereinbelow.

As a variant, the determination of the feature C2 can be based or not on measurements M2 of motor currents but on measurements of motor voltages during a freewheeling phase, as detailed hereinbelow.

Thus, configurations that are differentiated according to whether the electric motor exhibits a permanent magnetic flux or not can be applied.

In addition, if the electric motor does not comprise any permanent magnet, the electric motor can be determined to be of reluctant synchronous type.

It is thus possible to detect an electric motor of reluctant synchronous type and to set up the variable speed drive which is linked to it accordingly.

According to one embodiment, the sequence S2 of motor voltages can be applied in a direction orthogonal to the direction of anisotropy of the electric motor in order to drive the motor in rotation.

Thus, the sequence S2 is applied in the direction favouring the driving of the electric motor in rotation, which makes it possible to ensure that the injection of the sequence S2 does not damage the electric motor whose type is not determined.

According to one embodiment, the method can further comprise the determination of a steady-state gain of the motor on the basis of the measurements M1 and of the sequence S1, and the sequence S2 of motor voltages can be determined as a function of the determined steady-state gain.

Such an embodiment makes it possible to inject a sequence S2 of motor voltages which does not damage the electric motor.

According to one embodiment, if the motor is anisotropic, a sequence S3 of motor voltages can be applied successively twice, in two orthogonal voltage directions, according to the following operations:

applying a sequence S3 of motor voltages to the electric motor in a direction D3;

obtaining measurements M31 of motor currents during the application of the sequence S3 of motor voltages in the direction D3;

applying the sequence D3 of motor voltages to the electric motor in a direction D4 non-colinear to the direction D3;

obtaining measurements M32 of motor currents during the application of the sequence S3 of motor voltages in the direction D4;

comparing the measurements M31 and M32 in order to determine a feature C3 of the electric motor. The type of electric motor can be determined at least as a function of the feature C1 and of the feature C3.

Thus, the accuracy associated with the configuration of the motor is enhanced in that several features of the motor are taken into account. In the case where the sequence S3 is applied in two directions D3 and D4 only, D3 and D4 can be substantially orthogonal. S3 can be applied in three directions D3, D4 and D5 spaced apart by approximately 120° from one another.

In addition, the feature C3 can characterize the fact that the electric motor exhibits or does not exhibit a salience and, if the electric motor does not exhibit any salience of inductance of a rotor, the electric motor can be determined to be of the smooth pole motor type with permanent magnet such as, for example, a synchronous motor with the magnet on the surface.

Thus, configurations differentiated according to whether the electric motor exhibits salience or not can be applied.

In addition, if the motor exhibits salience of inductance of the rotor and if the motor comprises a rotor comprising a permanent flux, the electric motor can be determined to be of the protruding pole motor type with permanent magnet such as, for example, a synchronous motor with the magnet inside.

It is thus possible to detect an electric motor of protruding type with permanent magnet and to set up the variable speed drive which is linked to it accordingly.

According to one embodiment, the sequence S3 can be a high-frequency succession of motor voltages or can be a voltage step.

According to one embodiment, the sequence S1 of motor voltages consists in progressively increasing the motor voltage as long as the measurements M1 of motor currents remain below a maximum motor current value.

Such an embodiment makes it possible to ensure that the injection of the sequence S1 does not damage the electric motor whose type is not then determined.

In addition, the method can comprise a preliminary step of manual input of the maximum motor current value.

The maximum motor current value is generally easily accessible to the user (it can be included in the electric motor reference).

According to one embodiment, the sequence S2 of motor voltages can be determined as a function of the steady-state gain and of the maximum motor current value.

Thus, the sequence S2 can be adapted to the electric motor so as not to damage it, which avoids having to monitor the motor currents in real time upon the injection of the sequence S2.

A second aspect of the invention relates to a program that can be run by a processor and comprising instructions for, when it is run by the processor, implementing the steps of a method according to the first aspect of the invention.

A third aspect of the invention relates to a device for configuring a variable speed drive in charge of power supply (three-phase for example) of an electric motor, the configuration device comprising:

a voltage injection unit set up to apply a sequence S1 of motor voltages to the electric motor via the variable speed drive;

an obtaining unit set up to obtain measurements M1 of motor currents during the application of the sequence S1 of motor voltages;

a motor type determination unit set up to determine a feature C1 of the electric motor on the basis of the measurements M1 of motor currents and to determine an electric motor type at least as a function of the feature C1;

a configuration unit capable of configuring the variable speed drive as a function of the determined electric motor type.

BRIEF DESCRIPTION OF THE FIGURES

By way of example only, the embodiments of the invention will be described with reference to the drawings, in which.

DETAILED DESCRIPTION

Figure 1:
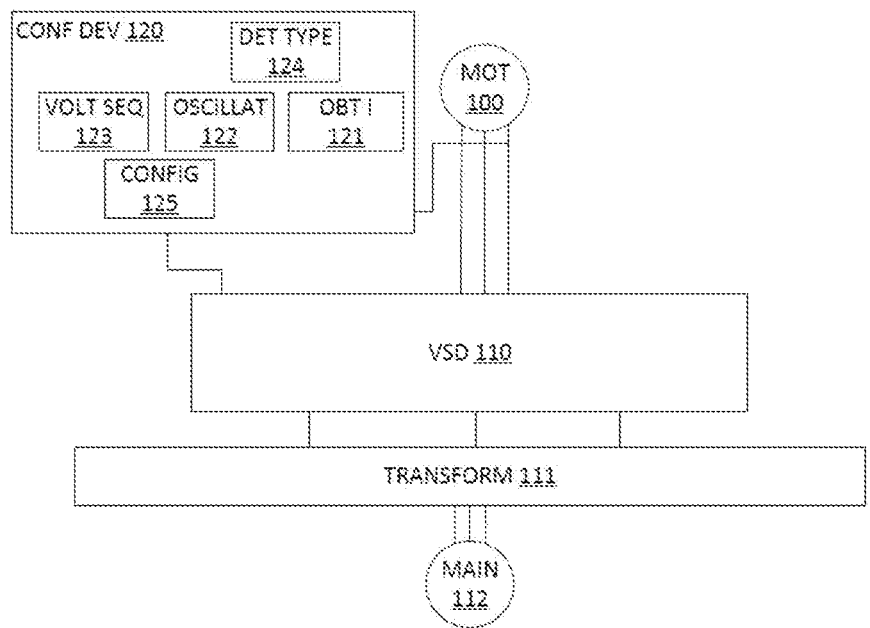
FIG. 1 illustrates a system for controlling the power supply of an electric motor according to an embodiment of the invention.

FIG. 1 presents a system according to an embodiment of the invention.

The system comprises a variable speed drive 110, an electric motor 100 and a configuration device 120 according to an embodiment of the invention. The configuration device can be incorporated in the variable speed drive 110 or can be separate from the variable speed drive 110.

The variable speed drive 110 can be supplied by a transformer 111 linked to a main electricity network 112, such as a network supplying a three-phase power supply.

The configuration device 120 comprises:
a unit for obtaining motor currents 121;
a unit for detecting oscillations 122;
a unit for injecting sequences of motor voltages 123;
a unit for determining a motor type 124;
a unit for configuring the variable speed drive 125.

Hereinafter in the description, the electric motor 100 is of three-phase type. However, there is no restriction attached to the power supply of the electric motor.

The method can be implemented during a commissioning step before the normal operation of the motor in the context of its use.

The method can be implemented a single time to identify the type of electric motor.

A variable speed drive 110 comprises conventionally, but in a nonlimiting manner:
a rectifier stage connected to an electrical power supply source to receive an alternating voltage; the rectifier stage can be of passive type such as a diode bridge or active based on controlled transistors;
a DC power supply bus to which the voltage rectified by the rectifier stage is applied and comprising in particular two bus lines and at least one bus capacitor connected between the two lines to stabilize the bus voltage;
an inverter stage connected at the output of the DC bus and intended to chop the DC voltage supplied by the bus into a variable voltage intended for the electric motor 100. The inverter stage comprises several switching arms each comprising power transistors controlled to apply the variable voltage to the electric motor.

Figure 2:
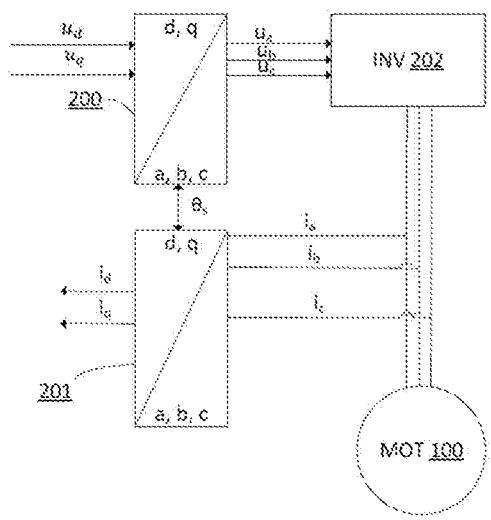
FIG. 2 illustrates the structure of a control device according to embodiments of the invention.

In FIG. 2, the following notations will be used:
$\theta_s$: electrical angle;
$u_d$: motor voltage on an axis d;
$u_q$: motor voltage on an axis q;
$i_d$: motor current on the axis d;
$i_q$: motor current on the axis q;
$u_a$, $u_b$ and $u_c$: motor voltages;
$i_a$, $i_b$ and $i_c$: motor currents;

The axes d and q form a reference frame in a plane at right angles to an axis of rotation of the electric motor 100.

As illustrated in FIG. 2, the variable speed drive 110 comprises an inverter stage 202 which can be controlled directly by motor voltages $u_a$, $u_b$ and $u_c$ or by motor voltages on the axes d and q, via a transformation block 200. The transformation block 200 is set up to apply a change of reference frame, from the reference frame d,q to the reference frame a,b,c. This block receives as input the motor voltage $u_d$ on the axis d and the motor voltage $u_q$ on the axis q and determines, from the angle $\theta_s$, the voltages $u_a$, $u_b$ and $u_c$ to be applied to the three phases of the electric motor 100. Such a block 200 is well known and will not be detailed further in the present description.

The variable speed drive 110 further comprises means for measuring motor currents $i_a$, $i_b$ and $i_c$, notably current sensors intended to measure the currents $i_a$, $i_b$ and $i_c$ present in the three phases of the motor M.

The variable speed drive 110 can further comprise a second transformation block 201 for applying a change of reference frame, from the reference frame a,b,c to the reference frame d,q. This block receives as input the currents $i_a$, $i_b$ and $i_c$ measured on the three phase of the electric motor and determines, from the angle $\theta_s$, the current $i_d$ on the axis d and the current $i_q$ on the axis q.

The unit for obtaining motor currents 121 of the configuration device 120 can be capable of receiving the motor currents measured by the variable speed drive 110 or can comprise its own means for measuring motor currents $i_a$, $i_b$ and $i_c$, notably current sensors intended to measure the currents $i_a$, $i_b$ and $i_c$ present in the three phases of the motor M.

The variable speed drive can comprise several control laws according to which it can be set up:
a vector control law, for asynchronous motors, which is a control with speed loop;
a control law for permanent magnet synchronous motors which can also be with speed loop on a vector control principle;
a control law for variable reluctance synchronous motors which can also be with speed loop on a vector control principle;
other control laws.

Other configuration parameters are applicable to the variable speed drive 110 according to the invention, such as alignment, fluxing, identification or compatibility parameters.

In particular, the invention provides for configuring such parameters of the variable speed drive 110 as a function of the type of electric motor to which it is linked.

Figure 3:
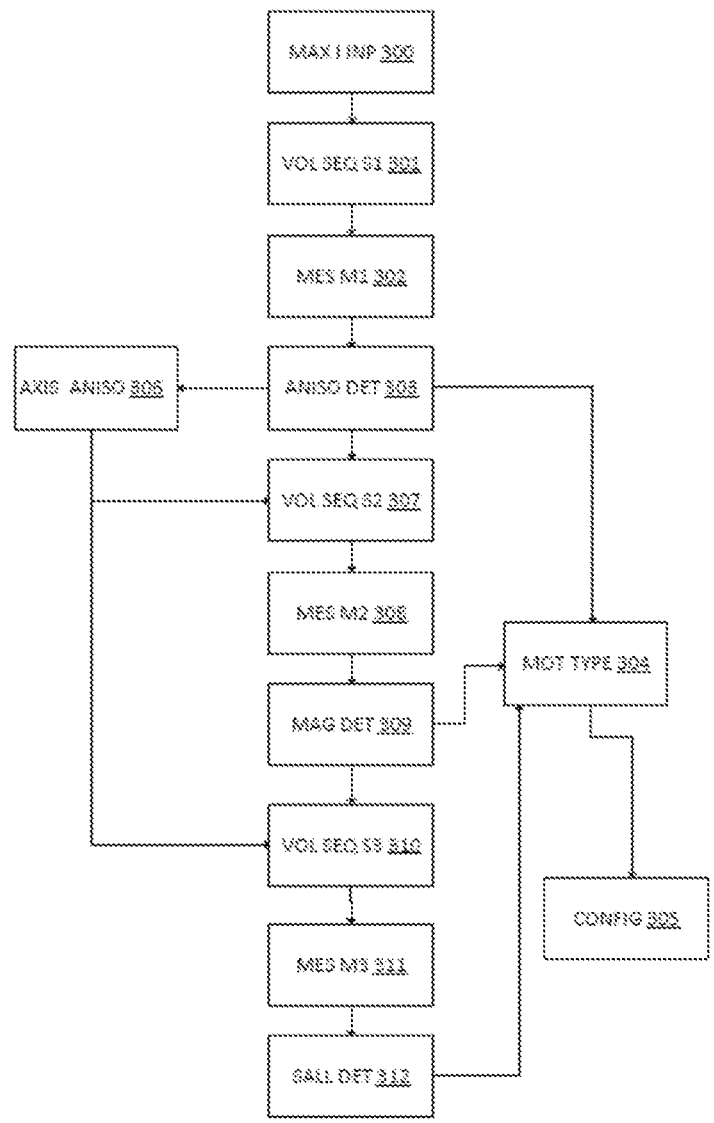
FIG. 3 is a diagram illustrating the steps of a method according to a general embodiment of the invention.

The operation of the configuration device will be better understood by referring to FIG. 3.

FIG. 3 is a diagram illustrating the steps of a method according to an embodiment of the invention.

In an optional step 300, a maximum motor current value is acquired. For example, such a value can be derived from a manual input of a user via a user interface of the configuration device (not represented in FIG. 1). Such a step can be implemented prior to the other steps of the method according to the invention, notably when the variable speed drive 110 is connected to the motor 100 or prior to its connection to the electric motor 100. Such a value is easily accessible to the user, in that it is generally indicated explicitly with the reference of the electric motor.

In a step 301, a first sequence S1 of motor voltages is transmitted to the variable speed drive 110 so as to control the power supply of the electric motor 100, by the unit for injecting motor voltage sequences 123. The motor voltages of the first sequence S1 can be the motor voltages $u_a$, $u_b$ and $u_c$ or can be the motor voltages $u_d$ and $u_q$.

The motor voltages can notably be transmitted to a control member of the inverter stage 202.

The first sequence S1 of motor voltages can comprise a ramp of increasing voltages with a slow time scale. In particular, the motor voltage values can be increased progressively until the motor current reaches the maximum current value obtained in the step 300, which makes it possible to protect the electric motor by guaranteeing that the value of the motor current remains lower than the maximum value defined in the step 300. Indeed, the type of motor is not known, the variable speed drive 110 is not initially set up for the type of the electric motor 100, and it is thus preferable to be cautious in order not to damage the electric motor 100.

In the step 302 which is performed in parallel to the step 301, measurements M1 of motor currents are obtained during the application of the sequence S1 of motor voltages. As previously explained, the measurements M1 can be obtained by a measuring means of the unit for obtaining motor currents 121, or can alternatively be received by the unit for obtaining motor currents 121 from measuring means of the variable speed drive 110.

In a step 303, a feature C1 of the electric motor is determined as a function of the measurements M1, by the unit for determining the type of motor 124. For example, the feature C1 can characterize the fact that the electric motor 100 exhibits an anisotropic property or does not. In practice, this concerns an anisotropy in the rotor of the electric motor 100. For example, an asynchronous motor comprises a rotor in the form of a squirrel cage which is isotropic as a function of the directions of injection of the motor voltages, whereas the synchronous motors exhibit an anisotropy and are thus sensitive to the direction of injection of the motor voltages.

If it is determined that the electric motor 100 exhibits an anisotropy, the step 303 can further comprise the detection of a main anisotropy axis. "Main" is understood to mean the axis along which the degree of anisotropy is the greatest.

The step 303 can further comprise the determination of a steady-state gain of the motor (stator resistance), notably, in case of oscillations in the measurements M1, when the motor current value is stabilized after having oscillated.

The anisotropy feature of the electric motor 110 can be determined as a function of the detection or non-detection of oscillations in the measurements M1 by the oscillation detection unit 122. In particular, the oscillations can be identified before the motor current measurements are stabilized. For example, "oscillation" can be understood to mean a succession of at least two periods of measurements respectively above/below a stabilization value towards which the motor current converges.

Thus, if the measurements M1 exhibit oscillations, it can be deduced that the electric motor exhibits an anisotropy.

According to one embodiment, the first sequence S1 is applied twice, in two non-colinear directions D1 and D2. Non-colinear directions are understood to mean two vectors of motor voltage values that are mutually non-colinear. The vectors comprise two components when the motor voltages $u_d$ and $u_q$ are used to control the variable speed drive 110, and comprise three components $u_a$, $u_b$ and $u_c$ when the motor voltages are used to control the variable speed drive 110. Preferably, the directions D1 and D2 form an angle substantially equal to 60 degrees.

In particular, it is preferable for the two directions D1 and D2 not to be orthogonal.

For example, in considering a direction D1 corresponding to a zero component along the axis q (and that is non-zero along the axis d), the direction D2 comprises a non-zero component along the axis q and a non-zero component along the axis d. Such an embodiment makes it possible to avoid having the electric motor being blocked in a position of unstable equilibrium along the axis d, notably when the electric motor is of synchronous type with magnetic reluctance.

In the case where the sequence S1 is injected at least twice, upon the first injection of the sequence S1 in a first direction, measurements M11 of motor currents are obtained. According to one embodiment, if the measurements M11 do not comprise oscillations (the motor current value is stabilized without oscillating), there is a second injection in a second direction that is non-colinear to the first direction and measurements M12 of motor currents are obtained. If, once again, the measurements M12 do not comprise oscillations, it can be deduced that the electric motor 100 does not exhibit anisotropy. Otherwise, the electric motor 100 exhibits an anisotropy.

The embodiment with two injections in non-colinear directions makes it possible to improve the detection of the feature C1 according to which the motor exhibits or does not exhibit an anisotropy.

Indeed, if a single injection was performed, a detection error could occur in the following case: considering a motor exhibiting an anisotropy along an anisotropy axis, if the first injection is performed in the direction of the anisotropy axis, then no oscillation is observed in the measurements M1 although the motor does indeed exhibit an anisotropy. Performing a second injection along an orthogonal axis makes it possible to resolve such a problem.

In a step 304, a type of electric motor can be determined at least on the basis of the feature C1 determined in the step 303, by the unit for determining the motor type 124. Other features can be considered to determine the type of electric motor 100.

In a step 305, the configuration unit 125 sets up the variable speed drive 110 as a function of the type of the electric motor 100. As indicated previously, such a configuration can comprise the definition of control laws or the setting of other configuration parameters.

According to embodiments of the invention, other features of the electric motor 100 can be determined in order to allow the identification of other types of motor. In particular, when the feature C1 characterizes the fact that the electric motor exhibits an anisotropic property, it is possible to more accurately determine to what the anisotropy is due in order to accurately determine the type of the electric motor.

To this end, the method according to one embodiment of the invention can further comprise an optional step of sending of a command to the variable speed drive 110 in order to align the electric motor in the direction of the anisotropy axis determined in the step 303. Thus, the axis d is aligned with the anisotropy axis of the electric motor 100.

According to one embodiment, the method can further comprise the steps 307 to 309 that make it possible to determine a second feature C2 of the electric motor 100. The feature C2 can characterize the fact that the electric motor 100 comprises or does not comprise a permanent magnet.

In the step 307, a second sequence S2 of motor voltages is transmitted to the variable speed drive 110 so as to control the power supply of the electric motor 100, by the unit for injecting sequences of motor voltages 123.

The second sequence S2 can be applied to drive the motor in rotation as a function of the anisotropy axis. Optimally, the first sequence S2 consists in applying motor voltages in a corresponding direction corresponding (or substantially equal) to a normal to the main anisotropy axis determined in the step 303. The sequence S2 can be predetermined. As a variant, the sequence S2 can be recalculated as a function of the maximum motor current value of the step 300 and as a function of the steady-state gain determined in the step 303, so as to ensure that the motor voltages applied in the sequence S2 do not involve exceeding the maximum motor current value.

In the step 308 which is performed in parallel to the step 307, measurements M2 of motor current are obtained during the application of the sequence S2 of motor voltages by the unit for obtaining these motor currents 121.

In the step 309, on the basis of the measurements M2, the unit for determining motor type 124 can determine the feature C2 according to which the electric motor 100 comprises or does not comprise a permanent magnet. Once the main axis (magnet, reluctance) is identified, combinations of current ($i_d, i_q$) make it possible to detect the presence of a voltage originating from the Back Electromotive Force (B-EMF) which is generated by the magnet in rotation. This voltage is proportional to the rotation speed multiplied by the flux of the permanent magnet so its presence makes it possible to detect the presence of a permanent magnet.

For example, the sequence S2 can be applied in a direction orthogonal to a salience axis d of the electric motor 100. The sequence S2 can further be determined so as to drive the electric motor 100 at a constant frequency.

The motor current is then measured in the direction d of the anisotropy of the motor to obtain the measurements M2. The sequence S2 can then consist in progressively reducing the voltages applied to the electric motor by a predefined percentage (substantially equal to 20% for example), and the variation of the measurements M2 is analysed. If the percentage variation of the motor current in the measurements M2 (absolute value of the difference between the initial value and the final value of the motor current along the axis d), relative to the absolute value of the initial value of the motor current along the axis d is below a certain predefined threshold (substantially equal to 40% for example), then the feature C2 can be that the electric motor does not comprise any permanent magnet. Otherwise, the unit 124 can deduce that the feature C2 is that the electric motor 100 comprises a permanent magnet.

As a variant, in an embodiment wherein the configuration device 120 or the variable speed drive 110 comprises a means for measuring motor voltages, the step 308 can consist in obtaining measurements M2 not of motor current but of the motor voltages. Most variable speed drives 110 comprise such measuring means, in which case the configuration device can comprise an obtaining unit (not represented in FIG. 1) for the motor voltages linked to (capable of communicating with) the measuring means of the variable speed drive 110. According to this variant, the sequence S2 can be applied then the variable speed drive 110 is disconnected from the motor (the power part of the variable speed drive 110 more specifically) and the measurements M2 of motor voltages are acquired during this "free-wheeling" phase. If a motor voltage proportional to the speed is detected during the free-wheeling phase, then the unit 124 can determine that the electric motor comprises a permanent magnet. In order to estimate the speed and the amplitude of the motor voltage, the unit 124 analyses the measurements M2. If the ratio of the amplitude of the voltage to the motor speed does not vary or varies very little (percentage variation is below a predetermined threshold), then the rotor of the electric motor exhibits a permanent flux, reflecting the existence of a permanent magnet (feature C2). Otherwise, the electric motor 100 does not comprise any permanent magnet.

The feature C2 and the feature C1 can thus be taken into account in the step 304 of determination of the type of the electric motor 100 implemented by the unit for determining electric motor type 124.

According to one embodiment, the method can further comprise the steps 307 to 309 making it possible to determine a third feature C3 of the electric motor 100. The feature C3 can characterize the fact that the electric motor 100 exhibits or does not exhibit a salience. "Salience" is understood to mean the feature of salience of the inductance of the electric motor: the electric flux, created by the electric current, circulates in the stator and the rotor. Depending on the geometrical form of the rotor, this electric flux does not always run through the same path depending on the position of the rotor due to the geometry thereof, which is called a geometrical salience. Thus, in a rotor with protruding poles, inductances along the axes d and q are different because of this salience. Conversely, in a rotor with smooth poles, the inductances do not vary as a function of the position of the rotor.

In the step 310, a third sequence S3 of motor voltages is transmitted to the variable speed drive 110 so as to control the power supply of the electric motor 100, by the unit for injecting sequences of motor voltages 123. The sequence S3 is injected at least twice in at least two mutually orthogonal directions D3 and D4. Upon each injection, respective measurements M31 and M32 of motor currents are acquired in the step 311 (each of the measurements M31 to M32 is a series of one or more measurements). There is no restriction on the sequence S3 of motor voltages which can be a voltage step (in the case where the electric motor is equipped with a brake), or high-frequency motor voltages (notably when the electric motor is not equipped with a brake). As a variant, the sequence S3 can be injected in three directions D3, D4 and D5. D3, D4 and D5 can be separated by 120 degrees from one another.

The directions D3, D4 and D5 correspond to the three phases of the motors (a, b, c) in the basic three-phase reference frame (situated at 120 degrees from one another). In this case, the variable speed drive injects a very high frequency voltage onto the three phases directly. The three-phase currents $i_a$, $i_b$ and $i_c$ are used directly to detect the presence of salience.

In the step 312, the measurements M31 and M32 are compared in order to deduce whether the electric motor 100 exhibits or does not exhibit salience. For example, if the measurements M31 and M32 are identical (or similar, that is to say that their difference is below a given threshold), then it can be deduced by the unit for determining motor type 124 that the electric motor does not exhibit salience (feature C3). On the other hand, if the measurements M31 and M32 are different (their difference is greater than the given threshold for example), it can be deduced by the unit for determining motor type 124 that the electric motor exhibits salience (feature C3).

In the embodiment with three injections in three directions D3, D4 and D5, measurements M31, M32 and M33 are obtained, and the measurements are compared one-to-one in order to deduce the third feature C3. Once again, if the measurements M31, M32 and M33 are identical pairwise (or similar), the unit for determining motor type 124 determines that the electric motor 100 does not exhibit salience. Otherwise, the unit for determining motor type 124 determines that the electric motor 100 exhibits salience.

Thus, in the step 304, the unit for determining motor type 124 can determine the type of motor by taking into account the feature C1 and the feature C3, or by taking into account the features C1, C2 and C3.

In the embodiment wherein both the steps 307 to 309 and 310 to 312 are applied (determination of the features C2 and C3), the steps 310 to 312 can alternatively be performed before the steps 307 to 309.

Figure 4:
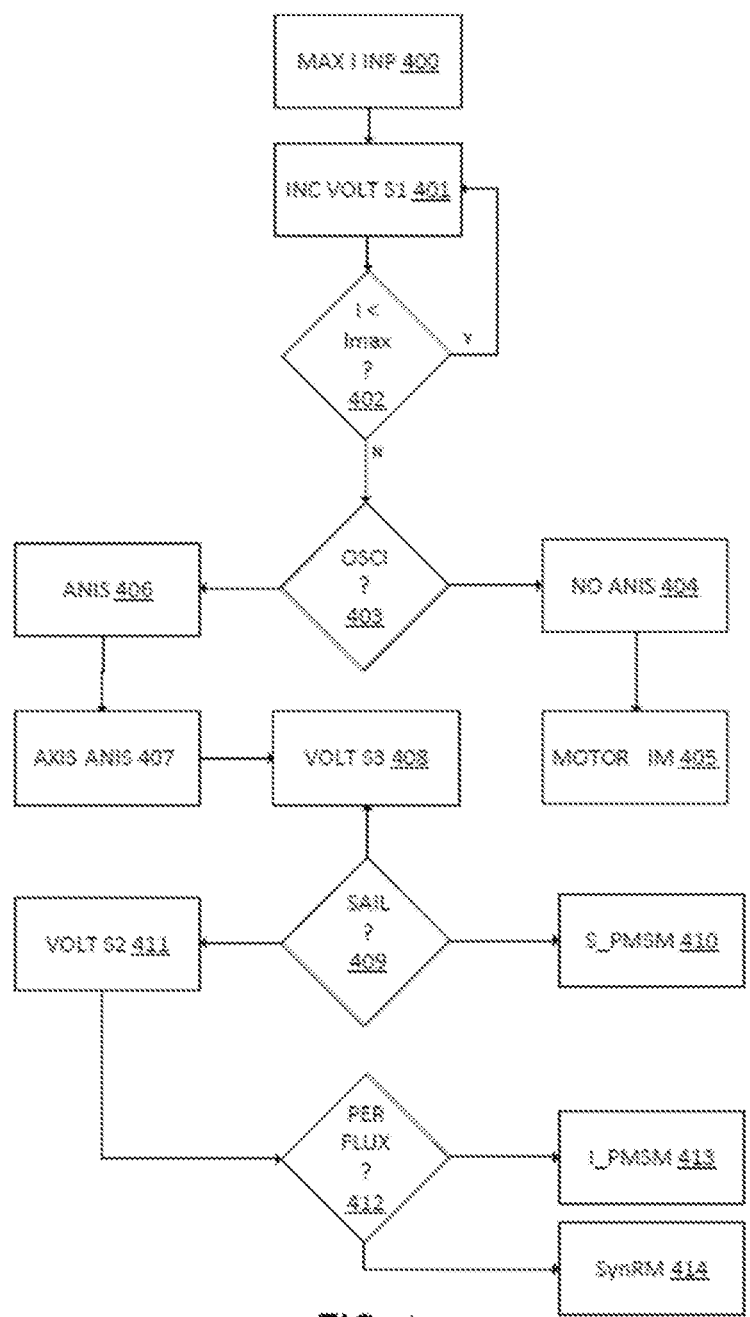
FIG. 4 is a diagram illustrating the steps of a method according to a specific embodiment of the invention.

FIG. 4 is a diagram illustrating the steps of a method according to a particular embodiment of the invention. It notably presents the determination of the features C1 to C3 in order to select a type of electric motor 100 from among four predefined types of electric motors, namely the induction motor, the motor with surface permanent magnet (with smooth pole), the motor with internal permanent magnet (with protruding pole) and the reluctant synchronous motor.

The step 400 is similar to the step 300 of FIG. 3: a maximum motor current value is defined.

In a step 401, a ramp S1 of motor voltages is applied and the motor current is measured at the same time (measurements M1).

In parallel, in a step 402, the motor current is measured and compared to the maximum motor current value. As long as the measured motor current is lower than the maximum motor current value, the sequence S1 is continued and the value of the motor voltage applied is increased.

When the measured current reaches or exceeds the maximum motor current value, the sequence S1 is stopped, the motor 100 is no longer supplying the variable speed drive 110 and the method goes on to the step 403.

In the step 403, the unit for detecting oscillations 122 determines whether the measurements M1 exhibit oscillations or do not. If the unit for detecting oscillations 122 determines that the measurements M1 do not exhibit oscillations in a step 404, then the unit for determining motor type 124 determines that the motor is of induction type in a step 405.

Otherwise, the unit for detection oscillations 122 determines that the measurements M1 exhibit oscillations in a step 406, it deduces therefrom that the electric motor exhibits anisotropy and a main anisotropy axis can be determined by the unit for determining motor type 124.

The variable speed drive 110 is then driven in a step 407 by the unit for injecting motor voltages 123 so as to align the electric motor with the main anisotropy axis.

The sequence of motor voltages S3 is then injected by the unit for injecting motor voltages 123 in a step 408, in at least two mutually orthogonal directions D3 and D4. In parallel, (at least) the measurements M31 and M32 of motor currents are obtained respectively for the directions D3 and D4.

The unit for determining motor type 124 determines, on the basis of a comparison of the measurements M31 and M32 whether the electric motor 100 exhibits salience or does not in a step 409.

If the electric motor 100 does not exhibit salience, the unit for determining motor type 124 determines that the electric motor 100 is of synchronous type with surface permanent magnet, in a step 410.

If the electric motor 100 exhibits salience, the unit for injecting motor voltages 123 injects the sequence S2 of motor voltages in a step 411, and, in parallel, measurements M2 of motor currents (or of motor voltages depending on the variant considered) are obtained.

In a step 412, the unit for determining motor type 124 determines whether the electric motor 100 exhibits a permanent magnetic flux or not in a step 412.

If the electric motor 100 exhibits a permanent magnetic flux, the unit for determining motor type 124 can determine that the electric motor 100 is of synchronous type with internal permanent magnet, in a step 413.

If the electric motor 100 does not exhibit permanent magnetic flux, the unit for determining motor type 124 determines that the electric motor 100 is of reluctant synchronous type, in a step 414.

On completion of the step 405, 410, 413 or 414, the configuration unit 125 sets up the variable speed drive 110 as a function of the determined type of electric motor.

Figure 5:
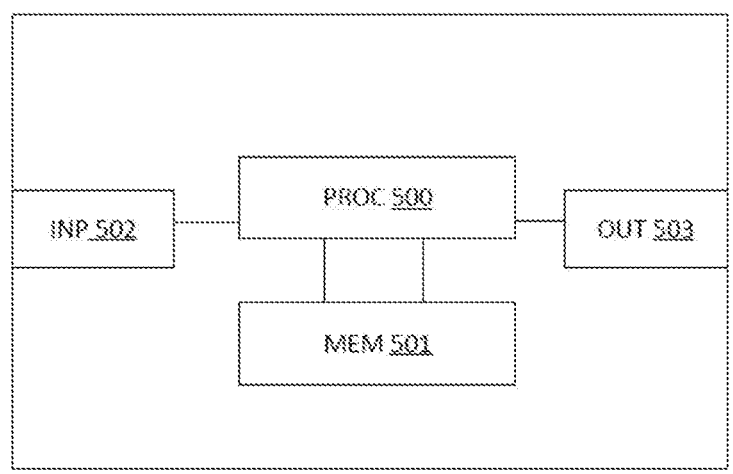
FIG. 5 illustrates the structure of a unit of a configuration device according to an embodiment of the invention.

FIG. 5 presents the structure of each of the units 122 to 125 of the configuration device 120 represented in FIG. 1.

The unit comprises a processor 500 associated with a memory 501, such as a Random Access Memory RAM, a Read Only Memory, a flash memory, a hard disk and/or any type of memory. The memory 501 stores at least the data necessary for the performance of the operations of the unit. It can also store computer program instructions that can be run by the processor 500 for the implementation of the functionalities of the unit. Alternatively, the processor 500 can be replaced by a microcontroller designed and set up to perform the functionalities of the unit.

The unit further comprises two input and output interfaces 502 and 503. Alternatively, the unit comprises a single bidirectional input/output interface. The interfaces 502 and 503 make it possible to communicate with the other units of the configuration device and/or with the variable speed drive 110.

Each of the units 122 to 125 can comprise the structure represented in FIG. 5. As a variant, the functionalities of the units 122 to 125 can be grouped together in one and the same structure with a processor running all of these functionalities.

Although the present invention has been described above with reference to particular embodiments, the invention is in no way limited to the forms described. The invention is only limited by what is defined in the claims, and embodiments other than those described above can fall within the scope of the claims.

Furthermore, although the embodiments have been described above as a combination of components and/or functions, it will be clearly understood that alternative embodiments can be obtained by other combinations of components and/or functions without in any way departing from the scope of the invention.

The invention claimed is:

1. Method for configuring a variable speed drive for supplying an electric motor, the method comprising the following operations:
   applying a first sequence of motor voltages to the electric motor via the variable speed drive;
   obtaining measurements of motor currents during the application of the first sequence of motor voltages;
   determining a first feature of the electric motor on the basis of the measurements of motor currents during the application of the first sequence of motor voltages;
   determining a type of electric motor at least as a function of the first feature;
   configuring the variable speed drive as a function of the determined type of electric motor;
   wherein the first sequence of motor voltages is applied successively twice, in at least two non-colinear voltage directions, according to the following operations:
   applying the first sequence of motor voltages to the electric motor in a first direction;
   obtaining measurements of motor currents during the application of the first sequence of motor voltages in the first direction;
   in case of determination that the measurements of motor currents during the application of the first sequence of motor voltages in the first direction exhibit oscillations, determining that the electric motor exhibits an anisotropic property;
   otherwise:
      applying the first sequence of motor voltages to the electric motor a second time at least in a second direction non-colinear to the first direction;
      obtaining measurements of motor currents during the application of the first sequence of motor voltages in the second direction;
      in case of detection that the measurements of motor currents during the application of the first sequence of motor voltages in the second direction exhibit oscillations, determining that the electric motor exhibits an anisotropic property;
      otherwise, determining that the electric motor does not exhibit any anisotropic property.

2. Method according to claim 1, wherein, when the first sequence of motor voltages is applied a second time, the applications of the first sequences of motor voltages are at least separated by a predetermined delay.

3. Method according to claim 1, wherein, if the electric motor does not exhibit any anisotropic property, the electric motor is determined to be of induction type.

4. Method according to claim 1, wherein, if the electric motor exhibits an anisotropic property, the method further comprises:
   detecting a main anisotropy axis of the electric motor following the application of the first sequence of motor voltages;
   applying a second sequence of motor voltages to drive the motor in rotation as a function of the anisotropy axis;
   obtaining measurements resulting from the application of the second sequence of motor voltages;
   determining a second feature of the electric motor as a function of the measurements resulting from the application of the second sequence of motor voltages;
   wherein the type of electric motor is determined at least as a function of the first feature and of the second feature.

5. Method according to claim 4, wherein the measurements resulting from the application of the second sequence of motor voltages are:
   measurements of motor currents acquired during the application of the second sequence of motor voltages;
   measurements of motor voltages acquired after the application of the second sequence of motor voltages.

6. Method according to claim 5, wherein the second sequence of motor voltages is applied in a direction orthogonal to the direction of anisotropy of the electric motor in order to drive the electric motor in rotation.

7. Method according to claim 5, further comprising determining a steady-state gain of the motor on the basis of the measurements of motor currents during the application of the first sequence of motor voltages and of the first sequence of motor voltages, and wherein the second sequence of motor voltages is determined as a function of the determined steady-state gain.

8. Method according to claim 7,
   wherein the first sequence of motor voltages consists in progressively increasing the motor voltage as long as the measurements of motor current during the application of the first sequence of motor voltages remain below a maximum motor current value; and
   wherein the second sequence of motor voltages is determined as a function of the steady-state gain and of the maximum motor current value.

9. Method according to claim 8, comprising a preliminary step of manual input of the maximum motor current value.

10. Method according to claim 4, wherein the second feature characterizes the fact that the electric motor comprises a rotor having or not having a permanent magnetic flux.

11. Method according to claim 10, wherein, if the electric motor does not comprise any permanent magnet, the electric motor is determined to be of a reluctant synchronous type.

12. Method according to claim 10,
   wherein, if the electric motor is anisotropic, a third sequence of motor voltages is applied successively twice, in two orthogonal voltage directions, according to the following operations;
   applying a third sequence of motor voltages to the electric motor in a third direction;
   obtaining measurements of motor currents during the application of the third sequence of motor voltages in the third direction;
   applying the third sequence of motor voltages to the electric motor in a fourth direction non-colinear to the third direction;
   obtaining measurements of motor currents during the application of the third sequence of motor voltages in the fourth direction;
   comparing the measurements of motor currents during the application of the third sequence of motor voltages in the third direction and motor currents during the application of the third sequence of motor voltages in the fourth direction in order to determine a third feature of the electric motor;
   wherein the type of electric motor is determined at least as a function of the first feature and of the third feature;
   wherein the third feature characterizes the fact that the electric motor exhibits or does not exhibit a salience and wherein, if the electric motor does not exhibit any salience of inductance of a rotor, the electric motor is determined to be of the type with surface permanent magnet; and wherein, if the electric motor exhibits salience of inductance of the rotor and if the motor comprises a rotor comprising a permanent magnetic flux, the electric motor is determined to be of the type with an internal permanent magnet.

13. Method according to claim 1, wherein, if the electric motor is anisotropic, a third sequence of motor voltages is applied successively twice, in two orthogonal voltage directions, according to the following operations:
   applying a third sequence of motor voltages to the electric motor in a third direction;
   obtaining measurements of motor currents during the application of the third sequence of motor voltages in the third direction;
   applying the third sequence of motor voltages to the electric motor in a fourth direction non-colinear to the third direction;
   obtaining measurements of motor currents during the application of the third sequence of motor voltages in the fourth direction;
   comparing the measurements of motor currents during the application of the third sequence of motor voltages in the third direction and motor currents during the application of the third sequence of motor voltages in the fourth direction in order to determine a third feature of the electric motor;
   wherein the type of electric motor is determined at least as a function of the first feature and of the third feature.

14. Method according to claim 13, wherein the third feature characterizes the fact that the electric motor exhibits or does not exhibit a salience and wherein, if the electric motor does not exhibit any salience of inductance of a rotor, the electric motor is determined to be of the type with surface permanent magnet.

15. Method according to claim 13, wherein the third sequence of motor voltages is a high-frequency succession of voltages or is a voltage step.

16. Method according to claim 1, wherein the first sequence of motor voltages consists in progressively increasing the motor voltage as long as the measurements of motor current during the application of the first sequence of motor voltages remain below a maximum motor current value.

17. Method according to claim 16, comprising a preliminary step of manual input of the maximum motor current value.

18. Computer program product comprising a non-transitory processor-readable medium having processor-executable instructions stored thereon, which when executed by a processor, cause a device to perform the method according to claim 1.

19. Device for configuring a variable speed drive in charge of power supply of an electric motor, the configuration device comprising:
   a voltage injection unit configured to apply a sequence of motor voltages to the electric motor via the variable speed drive;
   an obtaining unit set up configured to obtain measurements of motor current during the application of the sequence of motor voltages;
   a motor type determination unit configured to determine a feature of the electric motor on the basis of the motor current measurements of motor current and to determine an electric motor type at least as a function of the determined feature;
   a configuration unit capable of configuring adapted to configure the variable speed drive as a function of the determined electric motor type.

\* \* \* \* \*